US008860856B2

(12) United States Patent
Wetzstein et al.

(10) Patent No.: US 8,860,856 B2
(45) Date of Patent: Oct. 14, 2014

(54) MULTIPLEXED IMAGING

(75) Inventors: Gordon Wetzstein, Vancouver (CA); Ivo Bodo Ihrke, Vancouver (CA); Wolfgang Heidrich, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 449 days.

(21) Appl. No.: 13/142,851

(22) PCT Filed: Jan. 15, 2010

(86) PCT No.: PCT/CA2010/000055
§ 371 (c)(1),
(2), (4) Date: Jun. 29, 2011

(87) PCT Pub. No.: WO2010/081229
PCT Pub. Date: Jul. 22, 2010

(65) Prior Publication Data
US 2011/0267482 A1   Nov. 3, 2011

Related U.S. Application Data

(60) Provisional application No. 61/145,689, filed on Jan. 19, 2009.

(51) Int. Cl.
*H04N 3/14*   (2006.01)
*H04N 5/335*   (2011.01)
*H04N 9/04*   (2006.01)
*H04N 9/083*   (2006.01)

(52) U.S. Cl.
USPC ........................................ 348/273; 348/222.1

(58) Field of Classification Search
USPC .............. 348/207.99, 218.1, 222.1, 273, 280, 348/335, 336, 340, 342, 343; 382/162, 167, 382/275, 276, 280
See application file for complete search history.

(56) References Cited

U.S. PATENT DOCUMENTS

2008/0285052 A1   11/2008   Miyashita et al.

FOREIGN PATENT DOCUMENTS

| JP | 2007-086720 A | 4/2007 |
| WO | 0161994 A1 | 8/2001 |

OTHER PUBLICATIONS

Hirakawa et al., "Spatio-spectral Color Filter Array Design for Enhanced Image Fidelity", ICIP 2007, p. II-81-II-84, 2007.*
Condat, "A New Class of Color Filter Arrays with Optimal Sensing Properties," IEEE Transactions on Image Processing, Dec. 2008.*
Georgiev, T. et al., "Light-Field Capture by Multiplexing in the Frequency Domain", Mar. 1, 2003, pp. 1-13 (retrieved from the Internet on Oct. 27, 2008: http://www.tgeorgiev.net/FrequencyMultiplexing.pdf).
Li, X. et al., "Image Demosaicing: A Systematic Survey", Proceedings of SPIE, vol. 6822, Jan. 27, 2008.
Veeraraghavan, A. et al., "Dappled Photography: Mask Enhanced Cameras for Heterodyned Light Fields and Coded Aperture Refocusing", ACM Transactions on Graphics, vol. 26, No. 3, Jul. 2007.

\* cited by examiner

*Primary Examiner* — Dennis Hogue

(57) ABSTRACT

An imaging method comprises acquiring image data in which image components are spatially modulated at distinct spatial frequencies, transforming the image data into the Fourier domain and separating the image components in the Fourier domain. The image components may be transformed into the spatial domain. The image components may comprise different colors. In some embodiments saturated pixels are reconstructed by performing an optimization based on differences between image copies in the Fourier domain. Imaging apparatus may perform the imaging methods.

17 Claims, 8 Drawing Sheets

MULTIPLEXED IMAGING

CROSS REFERENCE TO RELATED APPLICATIONS

This application claims priority from U.S. Patent Application No. 61/145,689 filed on Jan. 19, 2009 and entitled MULTIPLEXED IMAGING. For the purposes of the United States, this application claims the benefit under 35 U.S.C. §119 of U.S. Patent Application No. 61/145,689 filed on 19 Jan. 2009 and entitled MULTIPLEXED IMAGING which is hereby incorporated herein by reference.

TECHNICAL FIELD

The invention relates to imaging and has application to photography. Some embodiments of the invention relate to the acquisition of high dynamic range (HDR) images. Some embodiments of the invention relate to the acquisition of color images.

SUMMARY OF THE INVENTION

Various example embodiments of the invention provide:
cameras,
camera systems,
imaging arrays for cameras,
methods for obtaining images,
methods for extracting multiple image characteristics from image data, and
apparatus for extracting multiple image characteristics from image data.

One aspect of the invention provides methods for obtaining image data. The methods comprise acquiring image data by exposing an imaging array to optical radiation and operating the imaging array. Acquiring the image data comprises spatially modulating a response of the imaging array to each of a plurality of components of the optical radiation according to a corresponding basis function for an invertible transformation. The method applies the transformation to the image data to yield transformed image data. The transformed image data comprises spatially-separated image copies corresponding respectively to the plurality of components. The method extracts the spatially-separated image copies from the transformed image data and applies an inverse of the transformation to each of the extracted image copies.

In some embodiments acquiring the image data comprises allowing the optical radiation to pass through an optical filter before interacting with pixels of the imaging array.

Another aspect provides an automated method for reconstructing pixel values for saturated pixels in an image. The method comprises obtaining image data comprising a band-limited exposure of an image having some saturated pixels. The exposure is spatially modulated. The spatial modulation occurs at one or more and, in some embodiments, two or more spatial frequencies by functions that differently attenuate the exposure. The method identifies the saturated pixels in the image data, computes a Fourier transform of the image data and sets up an optimization problem in which pixel values for the saturated components are unknown and an error measure to be minimized comprises a difference between Fourier domain image copies corresponding to the two or more spatial frequencies. The method numerically solves the optimization problem to obtain pixel values for the saturated pixels.

Another aspect of the invention provides imaging arrays comprising a filter wherein the filter transmissivity for each of a plurality of spectral bands varies spatially with a distinct spatial frequency.

Another aspect of the invention provides an automated image processing system comprising a processor and software instructions for execution by the processor. The software instructions comprise instructions that configure the processor to: obtain image data comprising a band-limited exposure of an image having some saturated pixels wherein the exposure is spatially modulated at two or more spatial frequencies by functions that differently attenuate the exposure; identify the saturated pixels in the image data; compute a Fourier transform of the image data; set up an optimization problem in which pixel values for the saturated components are unknown and an error measure to be minimized comprises a difference between Fourier domain image copies corresponding to the two or more spatial frequencies; and numerically solve the optimization problem to obtain pixel values for the saturated pixels.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A basic implementation of the invention involves obtaining an exposure to optical radiation in which the response of pixels in an imaging array to different components of the optical radiation is modulated spatially according to two or more different basis functions for a transformation. For example, where the transformation is a Fourier transformation the basis functions may be sine or cosine functions. The resulting image data is then transformed according to the transformation to yield transformed image data. In the transformed image data, information corresponding to the different components is spatially separated. For example, making the exposure through a sum of cosines filter results in exact copies of the original image in higher spatial frequency regions of the Fourier transformed image. That information can be extracted by selecting a corresponding portion of the transformed image data. An inverse transformation performed on the corresponding portion of the transformed image data yields component image data corresponding to one of the components.

To best achieve separation of the components in the transformed image data the transformation should have the property that multiplication by a function in the spatial domain corresponds to a convolution in the transformed domain. One class of transformation that possesses this property is the Fourier transformation.

This basic implementation may be applied in various ways. In some embodiments, spatial modulation according to the basis functions is combined with spectral filtering. Such embodiments facilitate separation of an image into different color components. The color components may be recombined to provide a color image. In an example embodiment the color components correspond at least to red, green and blue (R, G and B) colors.

Figure 1:
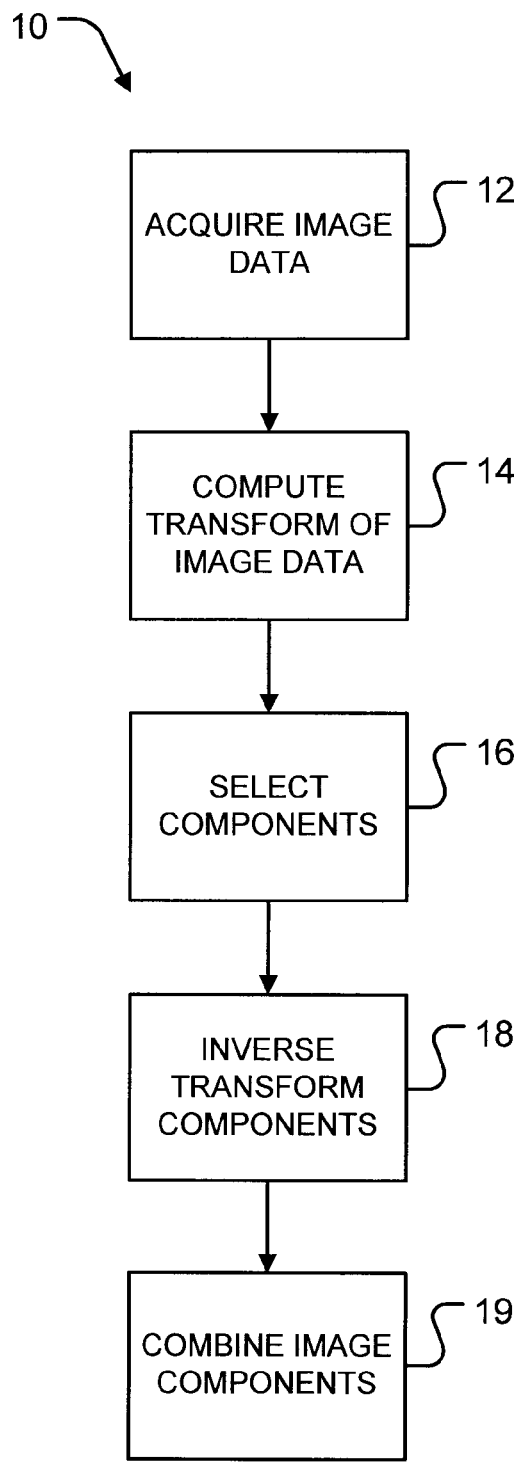
FIG. 1 is a flow chart illustrating a method for color imaging according to a first example embodiment of the invention.
Figure 2:
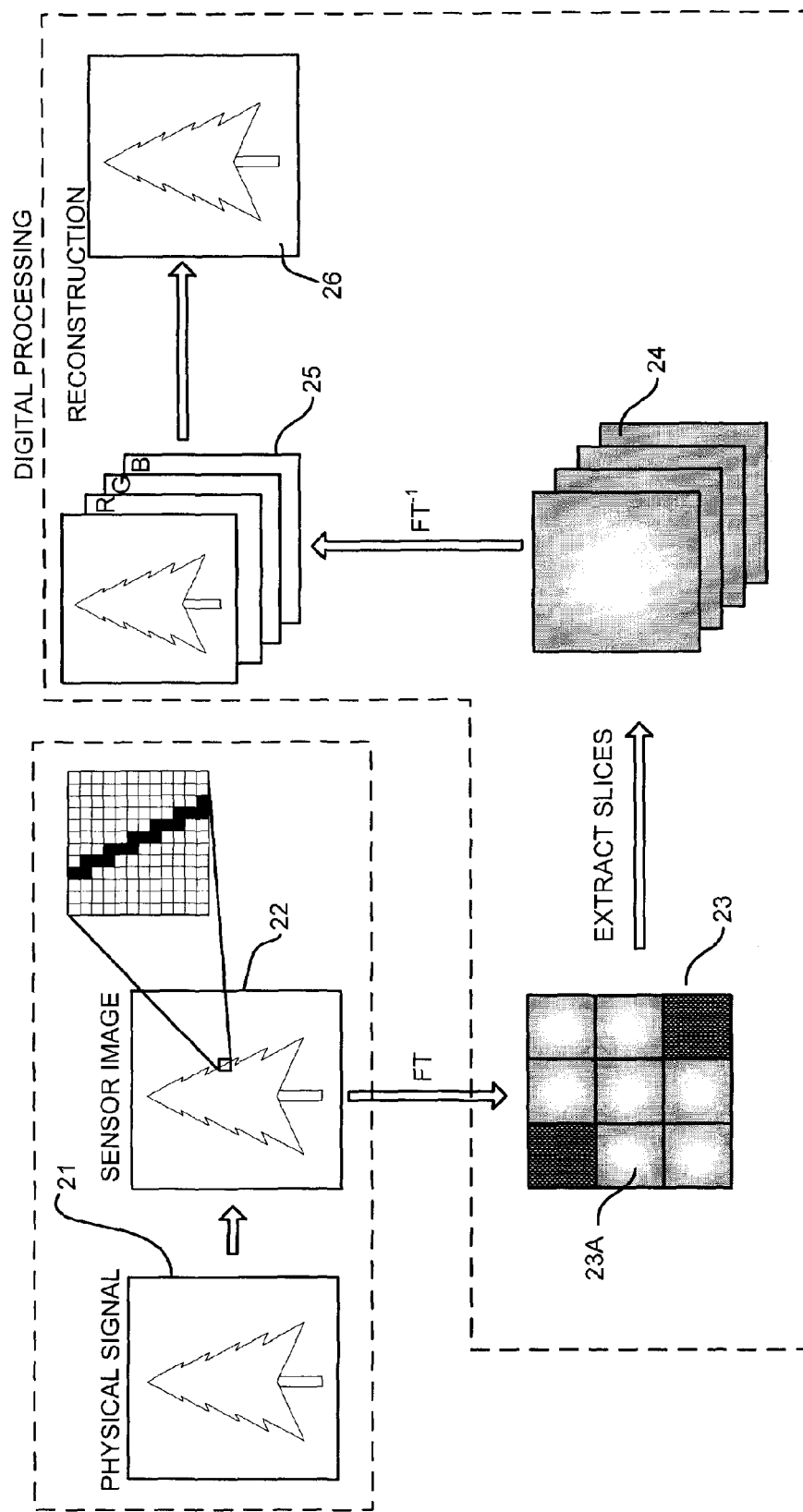
FIG. 2 illustrates the application of the method of FIG. 1 to an example image.

FIG. 1 is a flow chart illustrating a method 10 for color imaging according to a first example embodiment of the invention. FIG. 2 illustrates the application of method 10 to an example image 21. Block 12 comprises operating an imaging array to obtain image data 22. The technology used to implement the light-sensing pixels is not critical. By way of non-limiting example, the pixels may be pixels of a CMOS light sensor, an active pixel sensor (APS) array, a charge-coupled device (CCD) array, etc. Each pixel produces an output that is a function of the light incident on the pixel during the exposure.

The imaging array comprises a filter that light passes through before being detected by light-sensing pixels or some other mechanism for spatially modulating a response of the light-sensing pixels to components of the image. In this example embodiment the filter is in the image plane. Each pixel therefore receives light that has passed through a corresponding location (x, y) on the filter. The filter has a filter function $f$ that varies with position. In general, $f$ is a function of wavelength, $\lambda$, as well as the spatial coordinates x and y. The image data s(x, y) is therefore given, in general, by:

$$s(x, y,) = \int_\lambda l(x, y, \lambda) f(x, y, \lambda) \tau(x, y, \lambda) d\lambda \qquad (1)$$

where $\tau(x, y, \lambda)$ is the response of the pixels of the sensing array to light; and $l(x,y,\lambda)$ is the light irradiance on a sensor pixel. Where $\tau$ is the same for all pixels then $\tau$ can be given as $\tau(\lambda)$.

The filter function, $f$ may be given by:

$$f(x, y, \lambda) = \sum_{i=1}^{N-1} \alpha_i(x, y) b_i(\lambda) \qquad (2)$$

where $b_i(\lambda)$ are basis functions that describe the color spectra. Each color spectrum $b_i(\lambda)$ can be considered to represent a component of the incident light (which can be any optical radiation) incident on the imaging array. The color spectra may be non-overlapping and may be color primaries but this is not mandatory. In the following example, the color spectra are non-overlapping color primaries and N is the number of color primaries. $b_i(\lambda)$ may, for example, comprise bandpass filters or narrow-band notch filters. In some embodiments $b_i(\lambda)$ include filters that filter according to a high-pass and/or a low-pass filter characteristic. In some embodiments, $b_i(\lambda)$ are provided that pass red, green and blue light respectively. In some embodiments, $b_i(\lambda)$ correspond to primary colors of a printing or display device.

Filters for application as described herein are not required to have optical densities or transmissivities that vary continuously with position on the filter. The optical density or transmissivity may be constant over the area of any pixel of the imaging array used to acquire image data. This is not mandatory however.

Figure 3A:
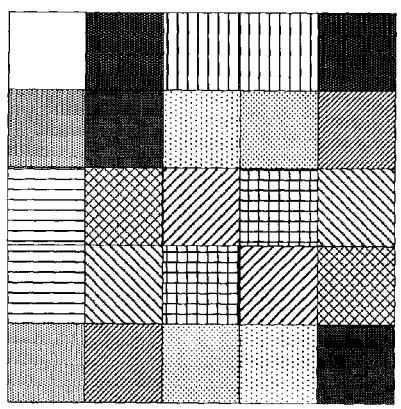
FIGS. 3A, 3B and 3C show tiles that may be assembled to make filters according to example embodiments that have spatial variation at multiple spatial frequencies.
Figure 3B:
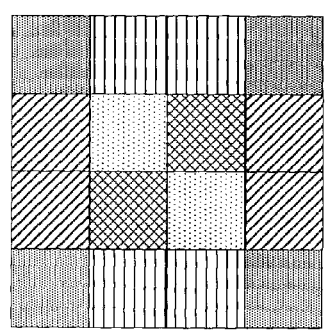
Figure 3C:
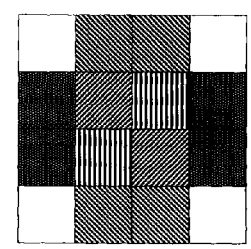

In some embodiments, the spatial frequencies in the filter are chosen so that the filter is spatially periodic with a period equal to a multiple of the pitch of pixels in the imaging array. In such embodiments, the filter may be constructed as an array of identical tiles. For example, FIG. 3A shows a 5×5 filter array that may be used as a filter in an embodiment and FIGS. 3B and 3C show example 4×4 filter arrays that may be used as filters in other example embodiments. Such filters may be patterned directly onto an imaging array.

The filter array of FIG. 3B encodes three spectral functions (red, green and blue filters) plus a monochromatic channel. A filter like that of FIG. 3B may be implemented so as to have a light transmittance of greater than 45%, for example, about 50%. As described below, it is possible to design filters of certain types as described herein that are 50% transmissive for an arbitrary number of channels.

$\alpha_i$ are basis functions for a transformation. In this example the transformation that will be used is a Fourier transform having basis functions that are cosines having different spatial frequencies. In this case, $\alpha_i$ can be given by:

$$\alpha_i(x,y) = \cos(2\pi k_1^i x + 2\pi k_2^i y) \qquad (3)$$

where $k_1^i$ and $k_2^i$ are constants (that may be equal to one another, or not, for any one basis function). Either of $k_1^i$ and $k_2^i$ may be zero but $k_1^i$ and $k_2^i$ are not both zero for any one basis function.

Consider the case where $\alpha_1$ corresponds to a filter $b_1$ which passes red light, $\alpha_2$ corresponds to a filter $b_2$ which passes green light, and $\alpha_3$ corresponds to a filter $b_3$ which passes blue light. When an exposure is taken, the red light component of the image is spatially modulated at a first spatial frequency (which depends upon the choices made for $k_1^1$ and $k_2^1$), the green light will be spatially modulated at a second spatial frequency (which depends upon the choices made for $k_1^2$ and $k_2^2$), and the blue light component will be spatially modulated a third spatial frequency (which depends upon the choices made for $k_1^3$ and $k_2^3$).

As described below, image data acquired in block 12 should be spatially band-limited.

The image data may be read out from the imaging array in any suitable manner. In block 14, a Fourier transform of the image data is determined. Block 14 yields transformed image data 23. In the Fourier transformed image data, different spatial frequencies are represented at different locations. Therefore, the Fourier transformed image includes Fourier transforms of the red, green and blue components of the image (which have deliberately been spatially modulated at different spatial frequencies) and therefore occur at different spaced apart locations in the transformed image data. In FIG.

2 it can be seen that transformed image 23 has a number of different components 23A. It can be seen that red, green and blue components are represented at different locations in the Fourier transformed image.

In block 16, the red, green and blue components 24 of the Fourier transformed image are each extracted. This may be achieved by cropping the Fourier transformed image, referencing the corresponding portions of the Fourier transformed image using the areas in the image where it is known that the red, green and blue components will be located, or the like. The areas in the transformed image data corresponding to the components 24 are known because the spatial frequencies with which the red, green and blue components were modulated is known. In the transformed image data, spatial location corresponds to frequency. In some embodiments the transformed image is logically or physically divided into tiles and tiles in the transformed image are associated with the components 24.

As mentioned above, block 12 may comprise spatially band-limiting the image (i.e. limiting the maximum spatial frequencies present in the originally captured image). This may be achieved in various ways. For example, the optical system used to focus optical radiation on the imaging array in block 12 may be defocussed slightly while acquiring the image; the optical system used to direct light onto the imaging array may include a diffuser, for example a holographic diffuser, in an optical path at or upstream from the imaging array which spreads the optical radiation slightly; an anti-aliasing filter may be provided at the imaging array; or the like. Spatially band-limiting the image ensures that the image data will not include spatial frequencies high enough to cause data corresponding to different components of the image data to overlap in the transformed image data. With such spatial band-limiting the transformed image data is made up of a number of spatially separated copies in which each of the copies represents a Fourier transform of the component of the image data corresponding to one of the filter functions $b_i(\lambda)$.

When capturing a spatially band-limited scene through the filter defined by Equation (2) with $\alpha_i$ as defined in Equation (3), spectral information is optically transformed into spatial frequencies. Specifically, the Fourier transform creates multiple copies of the scene around the fundamental spatial frequencies of the Fourier transformation. One can chose spatial frequencies such that the resulting copies will be conveniently arranged in the transformed image data.

Consider the case where the spatial variation of the filter is given by:

$$f(x, y, \lambda) = \sum_{i=1}^{N} \cos(2\pi k_x^i f_x^0 x + 2\pi k_y^i f_y^0 y) b_i(\lambda) \quad (4)$$

where $k_x^i$ and $k_y^i$ are integers and the pair of $k_x^i$ and $k_y^i$ for any value of i is unique. A suitable set of basis functions can be obtained by allowing the values of $k_x^i$ and $k_y^i$ to each range over 0 to Q. For example, with Q=1, $(k_x^i, k_y^i)=\{(0,1), (1,0)$ and $(1,1)\}$ (where $(k_1^i, k_y^i)=(0,0)$ is trivial and excluded. This provides three basis functions. In this case, in the Fourier transform of the image data, copies corresponding to the different basis functions will be centered in tiles of a 2×2 grid. The spatial frequencies corresponding to the centers of each copy are determined by the values chosen for the fundamental frequencies $f_x^0$ and $f_y^0$.

The 2D Fourier transform of the image data contains tiles that correspond to the 2D Fourier transform of the original signal, filtered by a specific spectral distribution given by the product of color channel $b_i(\lambda)$ and the spectral sensor response $\tau(\lambda)$. This can be expressed mathematically as:

$$F\{L_S\} = \sum_{i=o}^{N-1} \left( \delta(f_x - k_x^i f_x^0, f_y - k_y^i f_y^0) \otimes F\left\{ \int_\lambda L(x, y, \lambda) b_i(\lambda) \tau(\lambda) d\lambda \right\} \right)$$

Where F represents the Fourier transform and $L_S$ represents image data. Hence, each channel can be reconstructed by cropping the corresponding Fourier tile and performing a two-dimensional inverse Fourier transform.

Due to the symmetry of the Fourier transform of a cosine function a pair of copies corresponds to each channel. The two copies in each pair encode the same information. Block 16 may comprise extracting either one of the two copies for a channel or extracting both copies and combining them (for example, by adding).

In block 18, an inverse Fourier transform is computed for each of the components 24 extracted from the Fourier transformed image data 23. This yields reconstructed images 25 for each color channel.

In block 19, the image components are combined to yield a reconstructed image 26 which may be in any suitable image format. For example, the image components may be combined to provide image data in a suitable: JPEG, TIFF, GIF, PNG, BMP, or RAW data format (or any other suitable image format). Reconstructed image 26 may be stored, forwarded, sent to a display device for display, sent to a printer for printing or applied in any other desired manner.

Method 10 can be performed with any suitable sensor array. For example, image acquisition for method 10 may be performed with a standard digital camera having a suitable filter applied to the imaging array. This filter may be provided in place of a standard color filter (such as the Bayer pattern of red, green, and blue filter elements often provided in the imaging arrays of digital cameras). The example embodiment described above applies a spatially varying, semi-transparent filter that follows a sum-of-cosine distribution of intensities.

The methods described above are not limited to three colors but may be practiced with any number of color components. Also, the filter characteristics $b_i$ do not necessarily filter according to color. The filter characteristics could filter in whole or in part according to some other characteristic of the incident radiation, such as polarization. Also, the filter characteristics are not limited to passing single color components. One could, for example, modulate at one spatial frequency a filter which passes light at a plurality of different wavelength bands and blocks light having wavelengths between the bands.

Transforms of image data and inverse transforms may be determined through the application of general purpose or special purpose programmed data processors and/or by way of a suitably configured logic pipeline (either hardwired, for example, in an application specific integrated circuit (ASIC) or provided in a configurable logic, such as a field programmable gate array (FPGA)). For example, in the example embodiment described above, block 14 may be performed by executing a fast Fourier transform (FFT) algorithm or a discrete Fourier Transform (DFT) algorithm.

Real filters can only attenuate light but cannot amplify light or produce "negative light". Where an optical filter is used to spatially modulate image components the particular material(s) selected for the filter may have other limitations, such as limited contrast or the like. A real filter that can produce satisfactory results may be achieved, for example, by renormalizing a filter as specified by Equation (4) for each pixel with a linear function.

For example, let $f_{min}(x,y)$ be the minimum transmission value of the filter for a position (x,y) over all wavelengths and let $f_{max}(x,y)$ be the maximum transmission of the filter for any wavelength at position (x,y). A physically realizable filter $\vec{f}(x, y, \lambda)$ can be defined as:

$$\vec{f}(x, y, \lambda) = \gamma f(x, y, \lambda) + \phi \qquad (6)$$

where:

$$\gamma = \frac{1}{(f_{max}(x, y) - f_{min}(x, y))} \qquad (7)$$

and:

$$\phi = \frac{-f_{min}(x, y)}{(f_{max}(x, y) - f_{min}(x, y))} \qquad (8)$$

Different values of $\phi$ and $\gamma$ are possible to fulfill additional constraints, for example a constraint on overall light transmission. Imaging with such a modified filter produces a modified sensor image $\bar{S}$. The individual pixels of $\bar{S}$ can easily be mapped back into the original range, yielding an image s that can be processed as described above.

Figure 4:
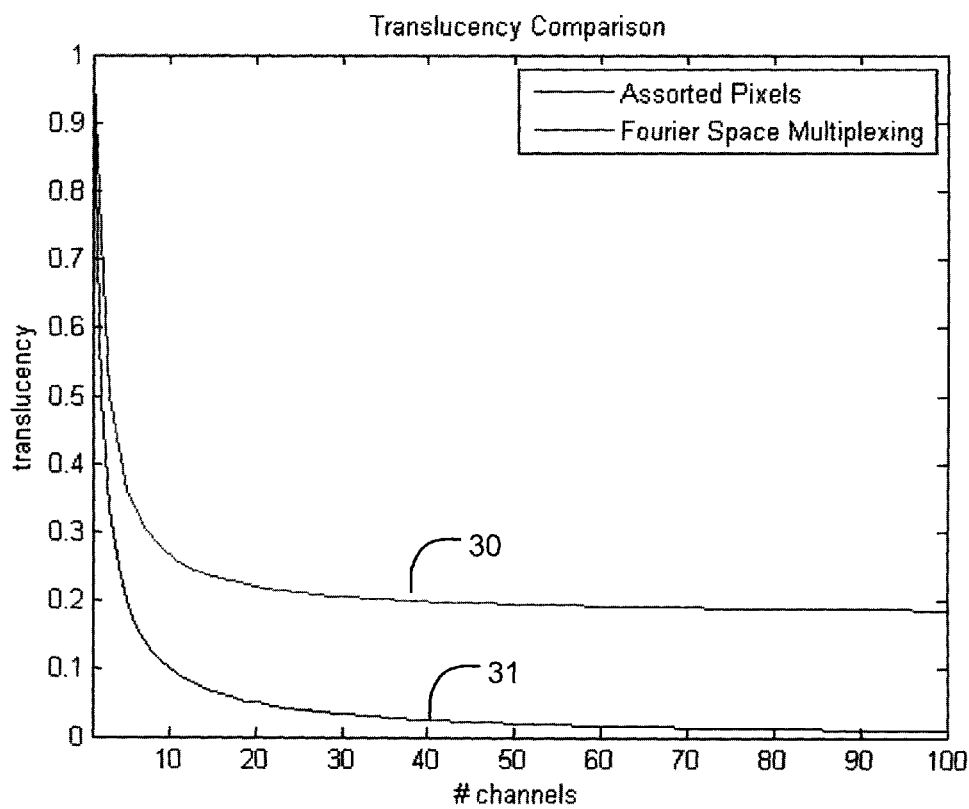
FIG. 4 is a graph which permits comparison of the translucency of a filter according to an example embodiment of the invention to a prior art filter.

One advantage of the methods described above over the use of conventional red green and blue filters arranged in a Bayer pattern or some other arrangements for obtaining color signals is that the filter can be more light-efficient than would be a standard filter capable of the same color separation. FIG. 4 shows a comparison of the translucency of a filter as described above (curve 30) to that of a filter (curve 31) based on the assorted pixels approach as described in Narasimhan, S., and Nayar, S. 2005. *Enhancing Resolution along Multiple Imaging Dimensions using Assorted Pixels*. IEEE Transactions on Pattern Analysis and Machine Intelligence 27, 4 (April), 518-530. It can be seen that the filter as described herein is more light efficient, especially for a larger number of channels. The light transmittance of a filter as described herein can be altered, for example, by increasing the ratio of $\phi$ to $\gamma$ in Equation (5). This increases the DC term of the filter's Fourier transform (which corresponds to the mean light transmittance of the spatial filter).

Figure 4A:
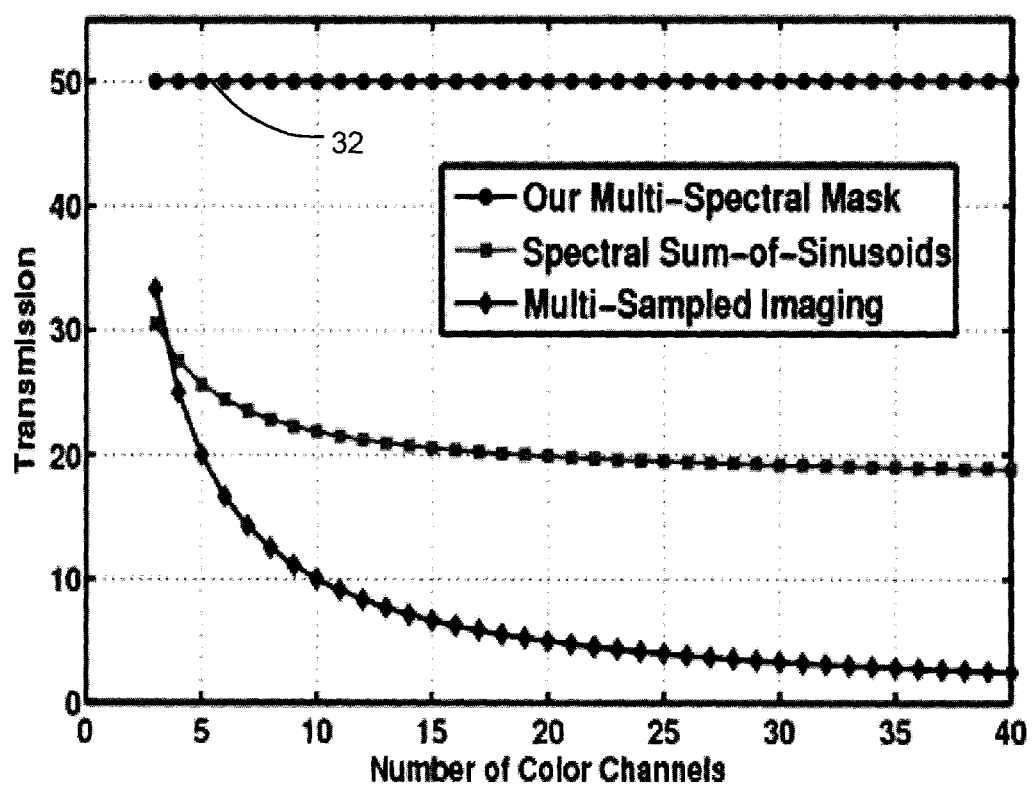
FIG. 4A is a graph showing translucency of a filter according to an embodiment of the invention as a function of a number of color channels.

The integral of a single normalized sinusoid is 50%. The total transmissivity of a filter (or 'mask') as described herein can therefore be made to be half of the sum of the transmissivities for the individual primaries $b_i(\lambda)$. FIG. 4A shows that a filter according to such an embodiment can have a transmissivity of 50% for an arbitrary number of color channels (curve 32).

The amount of information multiplexed into the Fourier image data may be increased by modulating the optical radiation according to sinusoids that are offset in phase when acquiring the image data. For example, a filter function may be given by:

$$f(x, y, \lambda) = \sum_{i=1}^{N} \cos(2\pi k_x^i f_x^0 x + 2\pi k_y^i f_y^0 y) b_i^1(\lambda) + \sum_{i=1}^{N} \sin(2\pi k_x^i f_x^0 x + 2\pi k_y^i f_y^0 y) b_i^2(\lambda) \qquad (9)$$

Providing two phase shifted sinusoids at each spatial frequency permits encoding of two spectral functions $b_i^1(\lambda)$ and $b_i^2(\lambda)$ with $i \in \{1 \ldots N\}$ at one spatial frequency. The resulting Fourier transform is no longer real, but complex. If m and n identify tiles in the Fourier domain that respectively contain copies that would contain the same information if the filter of Equation (4) were used then the images filtered with spectra $b_n^1(\lambda)$ and $b_n^2(\lambda)$ may be recovered from:

$$\text{Re}\left(\frac{L_m + L_n}{2}\right) \text{ and } \text{Im}\left(\frac{L_m - L_n}{2}\right) \qquad (10)$$

respectively.

All of the channels contribute to the copy in the central tile of the Fourier transform image data. This 'DC' component of the Fourier transform image data may be processed by an inverse Fourier transform to yield a luminance image. The luminance image tends to be relatively low in sensor noise. The luminance image may be combined with or used with reconstructed images 25 in the creation of output image 26. For example, an RGB image obtained from reconstructed images 25 may be transformed into a space having a luminance channel (such as a YUV space) by multiplying by a suitable matrix. The resulting luminance value may then be combined with or replaced by the luminance image. If desired a transformation back to RGB space or another desired color space may then be made.

It can be appreciated that there is a trade-off between the number of channels being recorded and the spatial resolution of the channels. In some embodiments the ratio between image resolution and the number of Fourier copies is non-fractional. In such embodiments, the number of pixels that make up a spatial tile equals the number of Dirac peaks in the Fourier domain. This can be achieved through appropriate selection of the fundamental frequencies in the x- and y-directions $f_x^0$ and $f_y^0$.

The methods and apparatus described herein are not limited to extracting color information. For example, with suitable filters one can encode any or a combination of: spectral information, polarization information, temporal information, and dynamic range information. Optical filter kernels may be designed to encode other image information in different spatial frequencies such that records of the image information are recorded at different spaced-apart locations in the Fourier domain. The following example applies a filter that approximates a derivative or gradient of the spatial frequency of an image. This information has various applications.

Figure 5:
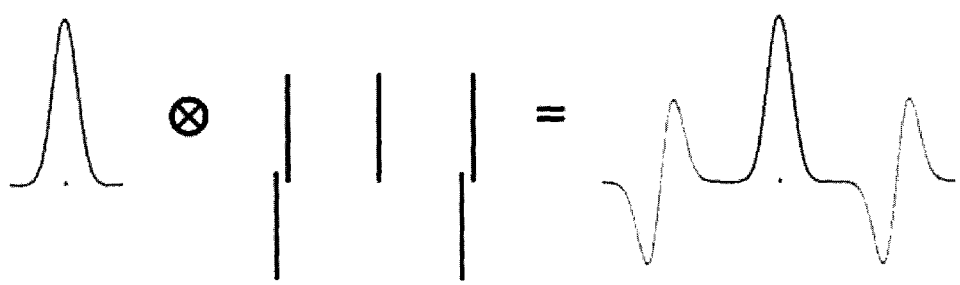
FIG. 5 schematically illustrates the operation in the Fourier domain of a gradient filter according to an example embodiment.

Consider computing a derivative of a function by means of convolution. One can do this by providing two samples of the function spaced closely together and with inverse signs. This can be expressed (in Fourier space) as follows:

$$\frac{dF(\omega)}{d\omega} = \lim_{\varepsilon \to 0}\left[\frac{\delta(\omega - \varepsilon) - \delta(\omega + \varepsilon)}{2\varepsilon}\right] \otimes F(\omega) \qquad (11)$$

where $\delta$ is the Dirac delta function and $\otimes$ represents convolution. A sine function is the function in the spatial domain that corresponds to a Dirac delta function in the Fourier domain. Therefore, copies in the Fourier domain that represent the first derivative dF/dω can be produced by applying a spatial optical filter having the following form:

$$d_1(x) = \lim_{\varepsilon \to 0} \left[ \frac{\sin((f_0 + \varepsilon)x) - \sin((f_0 - \varepsilon)x)}{2\varepsilon} \right] \quad (12)$$

and then performing a Fourier transform of the resulting image data. In practice, a filter is made by giving ε some small value. A schematic one-dimensional illustration of the application of a filter like that defined in Equation (12) is shown in FIG. 5. This filter can readily be generalized to two dimensions. A filter which modulates the exposure of images with two sine waves having slightly different frequencies may be applied as described above to permit recovery of the two-dimensional Fourier gradient of a signal.

One issue that arises in image acquisition is saturation. Saturation can be a particular difficulty in the acquisition of high dynamic range images. This is both because high dynamic range images have the capability of displaying details in shadow and/or highlight areas that a conventional image would not be expected to reproduce and because high dynamic range images may be desired in cases where high image quality is desired. Saturation results in the loss of detail in highlighted and/or shadow regions of an image.

Figure 6A:
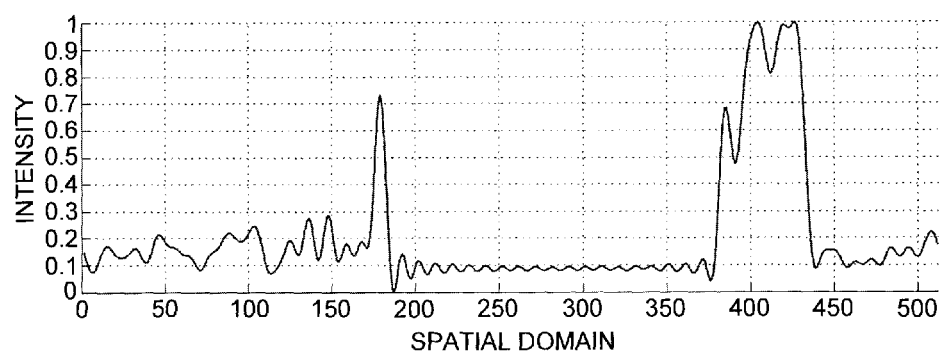
FIGS. 6A and 6B respectively show an example one dimensional image signal for a scanline of an image and its Fourier transform in the absence of clipping (as a result of saturation or otherwise).
Figure 6B:
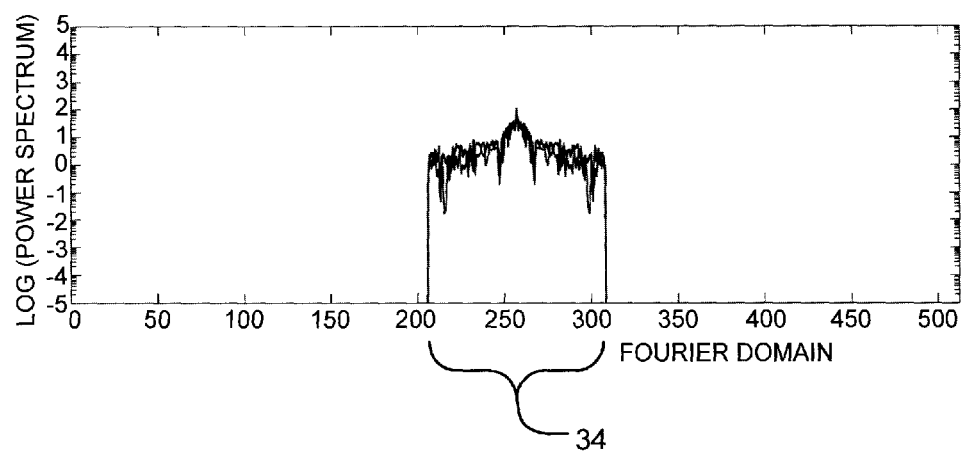
Figure 6C:
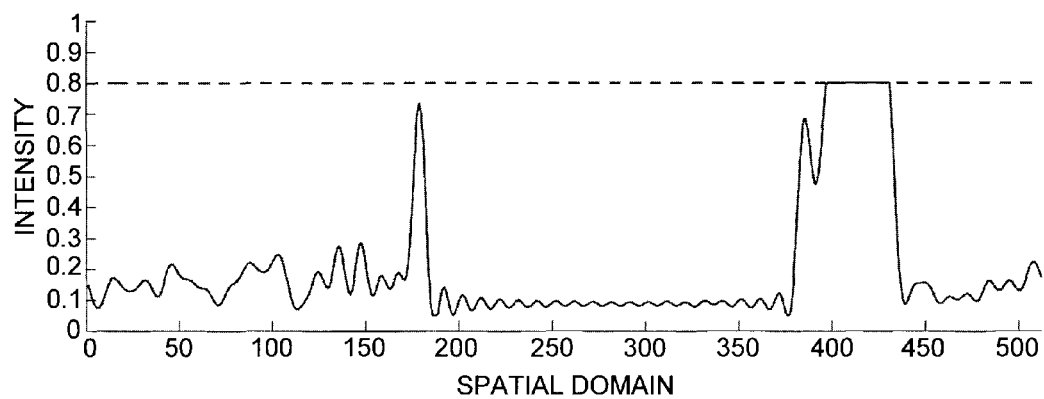
FIGS. 6C and 6D respectively show the same example one dimensional image signal for a scanline of an image and its Fourier transform in the presence of clipping.
Figure 6D:
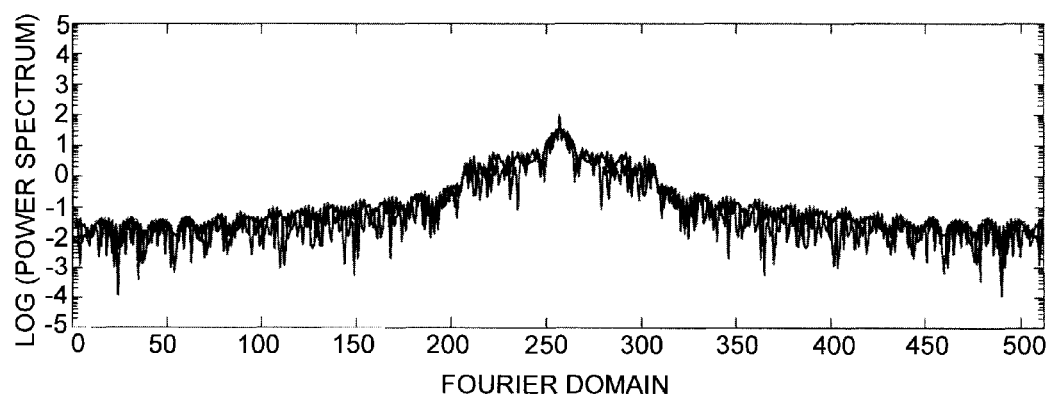

One aspect of the invention provides methods for reconstructing saturated regions of images. As illustrated in FIGS. 6A to 6D, it is typical that saturation artificially introduces higher spatial frequencies into an image. These higher frequencies may be distributed over the entire frequency domain. Compare FIGS. 6A and 6B which respectively show a band-limited signal made up of a single scan line taken from a high dynamic range image and its Fourier transform to FIGS. 6C and 6D showing the same signal clipped at an intensity level of 0.8 and its Fourier transform. It can be seen in FIG. 6B that the spatial frequencies present in the signal of FIG. 6A are all confined within a band 34. This is expected because the signal represented by FIG. 6A is band-limited. By contrast, FIG. 6D shows that the spatial frequencies present in the signal of FIG. 6C are spread over a broad spectrum and include substantial high frequency components.

Figure 7:
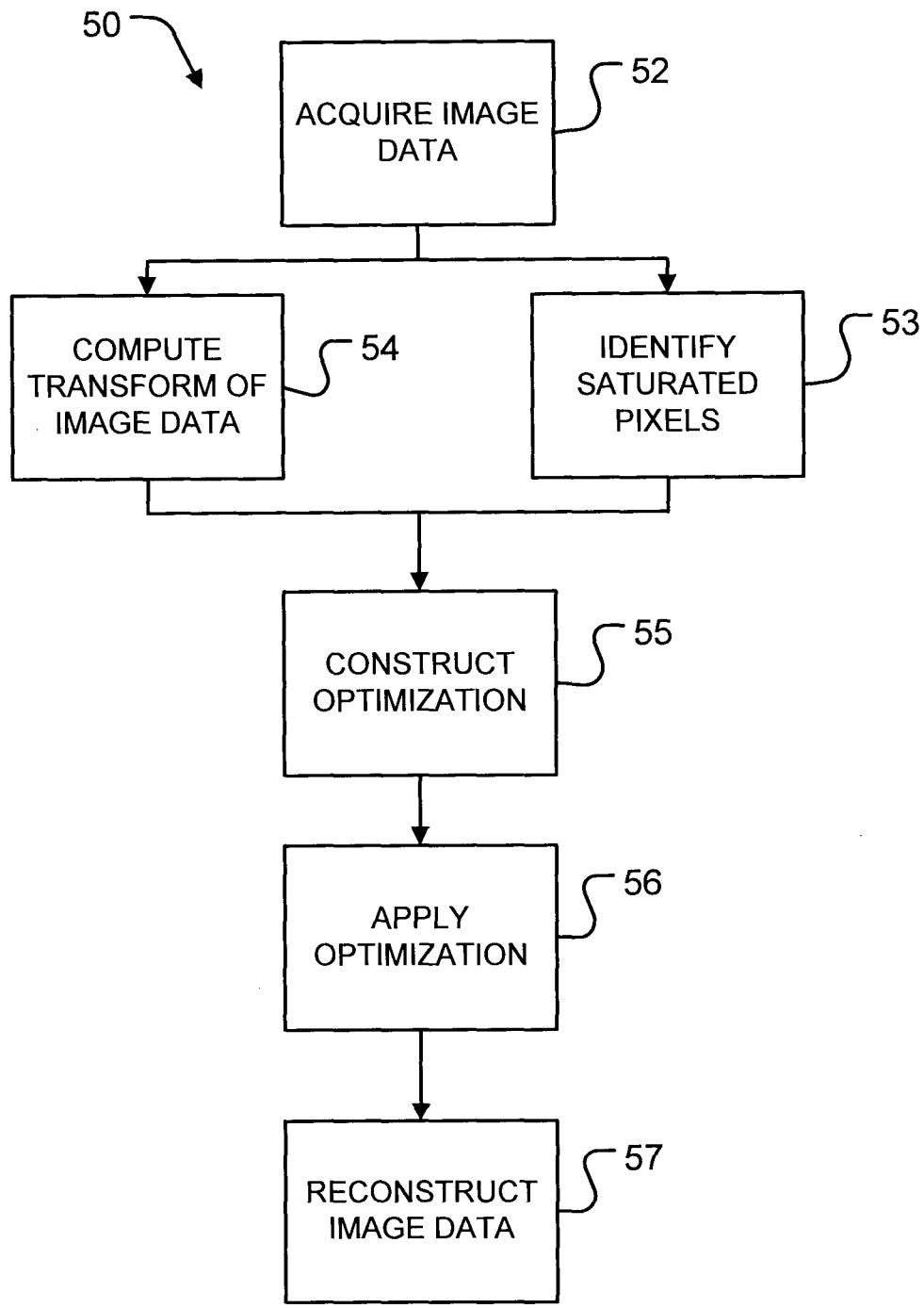
FIG. 7 is a flowchart illustrating a method for restoring saturated pixel values according to an example embodiment.

FIG. 7 illustrates an example method 50 for reconstructing saturated portions of an image. Method 50 generates monochrome images but can be generalized to generate color images as described below. In block 52 method 50 obtains a band-limited image at an imaging array. Block 52 comprises applying a known spatial modulation to the image.

The spatial modulation may be imposed by passing incident optical radiation through a filter having a filter function comprising a sum of two or more sinusoids (e.g. cosines or sines) or more generally a spatial variation that is periodic with first and second spatial frequencies. Different ones of the sinusoids may have different amplitudes. Block 52 yields image data.

Block 53 identifies saturated pixels in the image data.

Block 54 determines a Fourier transform of the image data obtained in block 52. This results in a transformed image that includes a number of differently-scaled copies. In the absence of saturation the copies are spaced apart from one another in Fourier space. However, saturation introduces high frequencies and so, in the general case, these copies will be corrupted even if the least transmissive among the neutral density filters do not saturate.

The next part of method 50 can be understood by noting that we have two pieces of information about the nature of the image data obtained in block 52. The first is that the original signal, before being modulated, is band-limited. Therefore, the captured image should not contain any high spatial frequencies. The second is that the filter copies the original signal with varying attenuation coefficients.

An image may be decomposed into a region in which the signal will be saturated in the image data, represented by $L_{sat}$ and a region in which the corresponding image data will not be saturated, represented by $L_{unsat}$. $L_{unsat}$ is equal to L, but has zeros in all saturated image parts. $L_{sat}$ has zeros in all unsaturated pixels and unknown values elsewhere. Since the Fourier transform is linear, the same relation holds for the Fourier representations of the signal's components, namely:

$$F\{L\} = F\{L_{sat}\} + F\{L_{unsat}\} \quad (13)$$

A goal of reconstructing saturated portions of image data is to determine the unknown values in $L_{sat}$ from the image data or at least to determine values which result in acceptable image characteristics.

An error measure in Fourier space that incorporates the known qualities of the signal can be expressed as follows:

$$Er = \sum_{i=1}^{N-1} \sum_{j=i+1}^{N} \|s_i T_i(f_x, f_y) - s_j T_j(f_x, f_y)\|_2^2 \quad (14)$$

where Er is the error measure, $T_i$ is a tile describing a single copy of the signal in the Fourier domain and is given by:

$$T_i = F_i \left\{ \left( \frac{1}{s_i} \right) L(x, y) + \eta_i \right\} \quad (15)$$

$s_i$ are the scaling factors for individual tiles in the Fourier domain as determined by the modulation applied to the signal and $\eta_i$ represents sensor noise.

From Equation (13), $T_i$ can be written (neglecting $s_i$) as:

$$T_i = F_i\{L_{unsat}\} + F_i\{L_{sat}\} + \eta_i \quad (16)$$

where $F_i$ is the Fourier transform that transforms a full-resolution image from the spatial domain into the subset of the frequency space that is spanned by tile i. For example, where the original image is of size m×n and each tile in the Fourier transformed image has a size of p×q then $F_i$ may be obtained by applying a rectangular discrete Fourier transform (DFT) of size pq×mn In Equation (16) the term $F_i\{L_{unsat}\}$ can readily be computed from the captured image data (neglecting the effect of sensor noise). $F_i\{L_{sat}\}$ includes the unknown values (the non-zero pixels of $L_{sat}$). We know that if these unknown values were accurately present in the image data instead of being clipped then the resulting signal would be band-limited. It is the replacement of these values in the image data with saturated values (e.g. values at the maximum output of the imaging array, or values above a saturation threshold) that causes saturation noise in the Fourier domain, including high frequency saturation noise outside of the frequency band of the band-limited signal.

Equations (14) and (16) can be combined to yield an expression of the error in terms of $L_{sat}$ and $L_{unsat}$ as follows:

$$Er = \sum_{i=1}^{N-1} \sum_{j=i+1}^{N} \quad (17)$$

$$\|s_i F_i\{L_{unsat}\} - s_j F_j\{L_{unsat}\} + s_i F_i\{L_{sat}\} - s_j F_j\{L_{sat}\} + \eta_i + \eta_j\|_2^2$$

If one desires to account for sensor noise then one can make reasonable assumptions regarding the form of the sensor noise. For example, one can assume that the sensor noise 11 is independently distributed in the spatial domain and observes a Gaussian noise distribution in the per-pixel image intensities. With this assumption, $F\{\eta_i\}$ has a uniform power spectrum with a Gaussian characteristic in each Fourier coefficient. This noise model is reasonable for many real image sensors for values above the noise level of the imaging array. Making a suitable assumption about the sensor noise (a suitable assumption in some cases could be that there is no sensor noise) facilitates the application of a quadratic error norm for optimization in Fourier space.

Equation (17) can be expressed as a linear system of equations having as unknowns values for the clipped pixels of $L_{sat}$. The system of linear equations can be solved to yield a solution or approximate solution which tends to minimize the error measure.

As a simple example, consider the case where, during image acquisition, an optical filter is applied such that in the Fourier transform of the image data there is a DC peak and one copy in a higher frequency band. In this case, neglecting sensor noise, the task of minimizing the error measure can be written as a matrix equation as follows:

$$\min \left\| \begin{pmatrix} 1 & -1 & 0 \\ 0 & 0 & 0 \\ 0 & -1 & 1 \end{pmatrix} \begin{bmatrix} F_1 \\ F_{DC} \\ F_1 \end{bmatrix} (L_{unsat} + L_{sat}) \right\|_2^2 = \min \|RF(L_{unsat} + L_{sat})\|_2^2 \quad (18)$$

where R and F are matrices. Matrix R will not generally be of full rank. This may be addressed by making a suitable assumption about the nature of the expected solution. For example, one can impose a condition on the nature of the combined signal $L_{sat}+L_{unsat}$. In this example, the condition imposes a spatial smoothness constraint, specifically, a curvature minimizing term. Adding the additional constraint to Equation (18) yields:

$$\min \|(RF+\lambda T)(L_{unsat}+L_{sat})\|_2^2 \quad (19)$$

where T is a regularizer, in this case a spatial curvature operator, and $\lambda$ is a weighting factor.

A least-squares description of the error measure may be obtained by differentiating Equation (19) with respect to $L_{sat}$ and setting the gradient to zero. This least squares description may be expressed as:

$$((RF_s)^*(RF_s)+\lambda T_s^* T_s)L_{sat} = -((RF_s)^*(RF_u)+\lambda T_s^* T_u) L_{unsat} \quad (20)$$

where $F_s$ and $T_s$ are the partial linear systems of the Fourier transform and the regularizer, respectively, acting on the saturated image regions and $F_u$ and $T_u$ are their counterparts acting on the unsaturated image regions. The right-hand side of Equation (20) is constant and is determined by the values in the unsaturated parts of the image data.

A set of values for the saturated pixels in $L_{sat}$ may be obtained by solving equation (20). This is done numerically.

For example, the conjugate gradient for least squares algorithm as described in HANSEN, P. C. 1998. *Rank-Deficient and Discrete Ill-Posed Problems: Numerical Aspects of Linear Inversion*. Society for Industrial and Applied Mathematics, Philadelphia, Pa., USA may be applied to obtain a solution to Equation (20). This algorithm is advantageous because it permits matrix multiplications to be implemented by fast image processing routines instead of constructing the actual matrices. Other suitable optimization algorithms may also be applied. Many such algorithms are known.

Method 50 applies the approach described above by, in block 55, constructing an optimization problem in which the unknown variables are the pixel values in saturated regions of the image data and applying an optimization algorithm to obtain best-fitting values for the unknown pixel values in block 56. Reconstructed image data is obtained in block 57 by inserting the pixel values determined in block 56 into the saturated regions of the image data.

Some embodiments optionally comprise applying an estimation algorithm to estimate true values for the pixel values in saturated regions of the image data prior to applying the optimization algorithm in block 56. For example, the estimation could be based on the assumption that the pixel values will have a local maximum at or near a centroid of a saturated region and will vary smoothly from that local maximum to the values at the boundary of the saturated region. In some embodiments, the value of the maximum may be selected based on one or more of: a size of the saturated region (e.g. a distance from the centroid to the closest point on the boundary of the saturated region); and gradients of the pixel values near boundaries of the saturated region. Making an estimate (in general a sensible rough guess) as to likely pixel values in the saturated region may improve the rate of convergence of the optimization algorithm applied in block 56. The estimate may be generated automatically.

Many variations in the implementation of method 50 are possible. A basic outline of method 50 is:
  obtain a band-limited exposure of an image and, in doing so, apply one or more filter functions that spatially modulate the exposure at distinct spatial frequencies and attenuate the exposure by different amounts;
  identify and demarcate saturated and unsaturated components of the resulting image data;
  compute the Fourier transform of the resulting image data;
  set up an optimization problem in which pixel values for the unsaturated components are known and an error measure to be minimized involves a difference between Fourier domain image copies corresponding to the different spatial frequencies which were imposed during exposure of the image;
  numerically solve the optimization problem to obtain pixel values for the saturated regions; and,
  insert the pixel values for the saturated regions into the image data.

The image data, as recreated by method 50, may represent a dynamic range greater than that of an imaging array applied to obtain the original image data.

While the above example reconstructs saturated pixels of a monochrome image, the same approach may be applied to reconstruct pixels in color images. There are a range of ways in which this may be done. For example, a method like method 50 may be performed for a luminance channel of an image. As another example, a method like method 50 may be performed individually for different color components within an image. In the latter case, different color components may be spatially modulated during exposure at each of two or more spatial frequencies with a different average level of attenuation at each of the spatial frequencies.

Method 50 and variants thereof may also be practiced in cases where a spatial modulation is imposed by color filters that have two or more spatial frequencies such that, in the Fourier domain, images taken with such filters present two or more copies of the image. Tiled filter arrays, such as the commonly-used Bayer filter have this characteristic. Therefore, in alternative embodiment, band-limited image data is acquired using an imaging array comprising a Bayer color filter. A Fourier transform of the resulting image data is determined. Saturated pixels in the image data are identified. An optimization involving unknown values for the saturated pixels is constructed using two or more of the copies from the Fourier domain. the optimization is solved subject to suitable constraints to yield values for the saturated pixels.

Advantageously, in some embodiments, all components of the image and/or all data for reconstruction of saturated areas may be obtained from a single exposure. Multiple exposures are not required.

It can be appreciated that the invention may be implemented in a wide variety of ways. After image data has been acquired, as described herein, processing to extract the various components of the images, or other processing such as processing to reconstruct saturated regions of an image, may be performed in various ways. For example, in some embodiments, a camera or other image acquisition device incorporates logic for processing the captured image to extract image components as described herein and/or to extract the image components to perform further processing on the image components. In other embodiments, the captured image is transferred from an image acquisition device to another processor (which could be a personal computer, computer system, or the like) and some or all processing of the image data may be performed on the device to which the image data is downloaded. Processing, as described herein, may be performed automatically at a processor when images are transferred from a camera or other imaging device to the processor.

Figure 8:
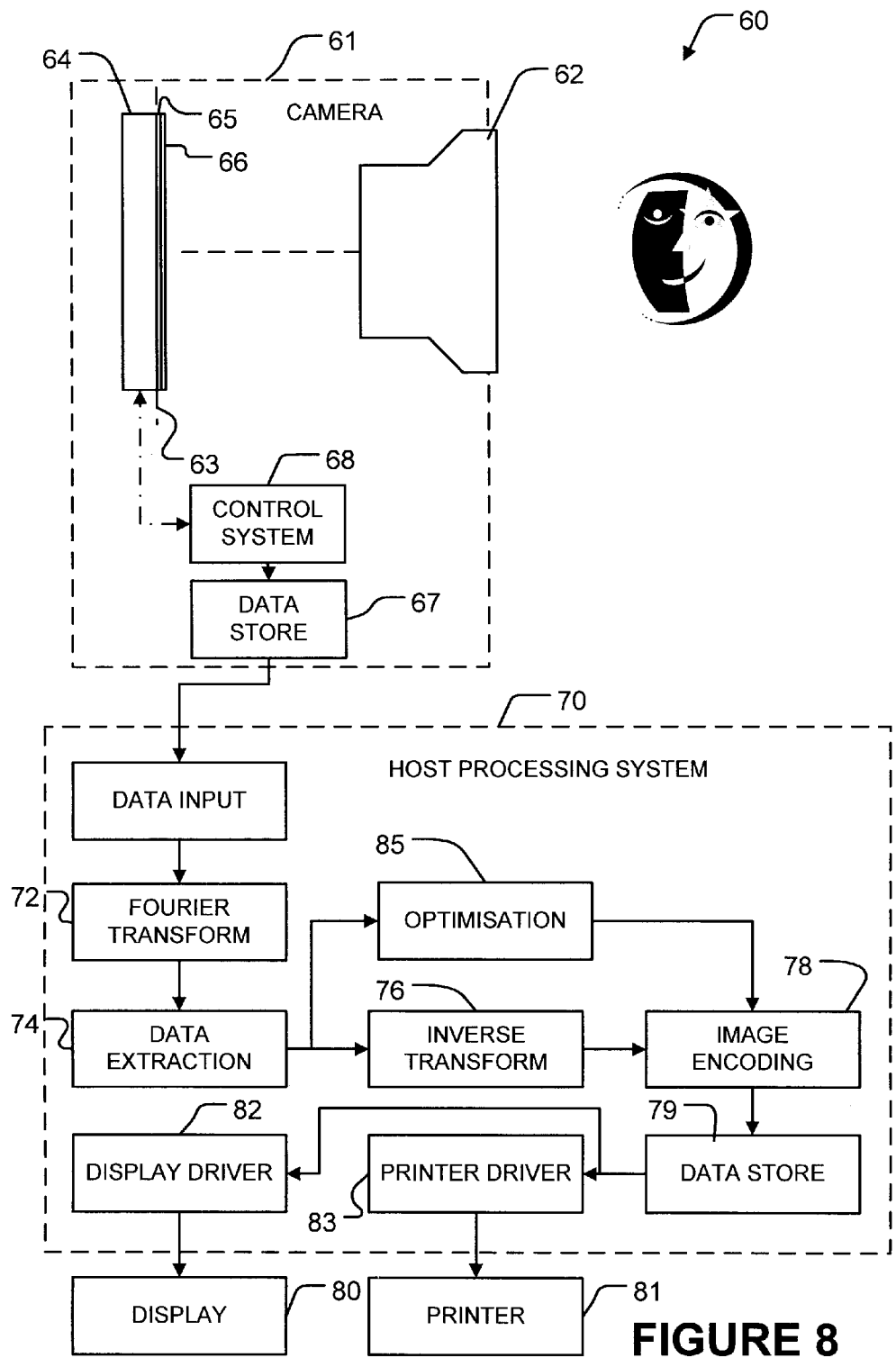
FIG. 8 is a functional block diagram illustrating a camera system according to an example embodiment.

FIG. 8 illustrates a camera system 60 according to an example embodiment. Camera system 60 comprises a camera 61 having an optical system 62 that focuses light onto an image plane 63 where the light can be imaged by an imaging array 64. A blurring filter 66 and a filter 65 that applies spatial modulation to different image components are provided at imaging array 64.

A control system 68 operates imaging array 64 to obtain exposures of a scene and stores the resulting image data in a data store 67. In this example embodiment, camera 61 is connected (or connectable) to a host processing system 70 that performs processing on the image data acquired by camera 61. This is not mandatory, in some embodiments, a single device provides functions of camera 61 and host processing system 70 or functions are allocated between camera 61 and host processing system 70 in some alternative manner.

Host processing system 70 comprises a Fourier transformation function 72 that computes a Fourier transform of image data retrieved from camera 61. A data extraction component 74 is configured to extract Fourier transforms of different image components and to provide the extracted Fourier transforms to an inverse Fourier transform component 76.

An image encoding system 78 receives image components from inverse Fourier transform component 76, generates image data in a desired format from the image components and stores the resulting image data in a data store 79. In the illustrated embodiment, host processing system 70 comprises a display 80 and a printer 81. A display driver 82 is configured to display on display 80 images corresponding to image data in data store 79. A printer driver 83 is configured to print on printer 81 images corresponding to image data in data store 79.

In the illustrated embodiment, an optimization system 85 receives image components from data extraction component 74 and generates values for the image data in saturated image regions. These values are provided to image encoding system 78 which incorporates them into the image data.

In some embodiments, host processing system 70 comprises a general purpose computer system and the components of host processing system 70 are provided by software executing on one or more processors of the computer system. In other embodiments, at least some functional blocks of host processor system 70 are provided by hard-wired or configurable logic circuits. In other embodiments, at least some functional blocks of host processor system 70 are provided by a special purpose programmed data processor such as a digital signal processor or graphics processor.

A number of variations are possible in the practice of the invention. Optical filters may be printed directly on an imaging array or provided in one or more separate layers applied to the imaging array.

In some embodiments the optical filters provided by way of a spatial light modulator in the light path to the imaging array. In such embodiments, the spatial frequencies with which incoming optical radiation is modulated may be changed during an exposure. For example, the spatial light modulator may be set to modulate incoming light with a first spatial frequency or a first set of spatial frequencies during a first part of the exposure and to switch to modulating the incoming optical radiation with a second spatial frequency or a second set of spatial frequencies during a second part of the exposure. The first and second parts of the exposure are optionally of different lengths. In such embodiments, different copies in the Fourier domain provide temporal information and may also provide differently-exposed copies of the image that may be used for high dynamic range reconstruction, reconstructing saturated pixel values or the like.

In some embodiments the optical modulation of the spatial filter is rotated relative to the pixel grid of the imaging array. As a result, different spectral copies have slightly different sub-pixel alignment. This can be used to recover the original image resolution by performing de-convolution with a small filter kernel corresponding to the optical low pass filter used for band-limiting.

In embodiments in which the filter is rotated relative to a pixel array, it can be desirable to compensate for the image of the filter itself in Fourier space. This can be done, for example, by taking a calibration image of a uniformly-illuminated white screen through the filter. Point spread functions of tiles of the filter in the Fourier domain may be obtained by Fourier-transforming the resulting image. Artefacts in the Fourier domain resulting from mis-alignment of the filter with pixels of the imaging array may be substantially removed using the calibration image.

As an alternative to an optical filter, which provides optical pre-modulation, certain types of filters may be implemented by selectively controlling the sensitivities of different sets of pixels in an imaging array. This may be done, for example, by setting the exposure times for different sets of pixels to be different or by using pixels of different sizes to vary light sensitivity across pixels. In either case, the sensitivity of the pixels may be caused to vary in a pattern having a spatial frequency that imposes a desired modulation of some image component in the image.

In some embodiments, a camera is provided that provides a separate sensor for capturing information for recreating the luminance of saturated areas in an image. The separate sensor may apply any of the methods as described above. The separate sensor may have a relatively low resolution (although this is not mandatory) since glare tends to limit the effect of spatial resolution of high dynamic range content.

Certain implementations of the invention comprise computer processors which execute software instructions which cause the processors to perform a method according to the invention for processing image data from a modulated exposure, as described herein. For example, one or more processors in a camera and/or an image processing system into which images from a camera are transferred may implement methods as described herein by executing software instructions in a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable instructions on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

A number of different embodiments are illustrated herein, the features of different embodiments may be combined in alternative combinations to yield further embodiments.

Accordingly, the scope of the invention is to be construed in accordance with the substance defined by the following claims.

What is claimed is:

1. A method for obtaining image data, the method comprising:
acquiring image data by exposing an imaging array to optical radiation and operating the imaging array, wherein acquiring the image data comprises spatially modulating a response of the imaging array to each of a plurality of components of the optical radiation according to a corresponding basis function for an invertible transformation;
applying the transformation to the image data to yield transformed image data, the transformed image data comprising spatially-separated image copies corresponding respectively to the plurality of components;
extracting the spatially-separated image copies from the transformed image data; and
applying an inverse of the transformation to each of the extracted image copies;
wherein the modulation is spatially periodic and has a spatial frequency that is different for each of the components.

2. A method according to claim 1 wherein acquiring the image data comprises allowing the optical radiation to pass through an optical filter before interacting with pixels of the imaging array.

3. A method according to claim 2 wherein the optical filter has a spatial variation having at least first and second spatial frequencies.

4. A method according to claim 2 wherein the optical filter has a transmissivity in excess of 45%.

5. A method according to claim 1 wherein acquiring the image data comprises band-limiting a spatial frequency of the optical radiation prior to allowing the optical radiation to interact with the imaging array.

6. A method according to claim 1 wherein the basis functions comprise sinusoids.

7. A method according to claim 1 wherein acquiring the image data comprises spatially modulating a response of the imaging array to a first one of the plurality of components of the optical radiation according to a first sinusoid having a first spatial frequency and spatially modulating a response of the imaging array to a second one of the plurality of components of the optical radiation according to a second sinusoid having the first spatial frequency and a phase difference of ¼ wave with the first sinusoid.

8. A method according to claim 7 comprising extracting a pair of spatially-separated copies each corresponding to the first spatial frequency, computing a real part of a sum of the pair of spatially-separated copies and an imaginary part of a difference of the pair of spatially-separated copies, and applying the inverse of the transformation to the real part and the imaginary part.

9. A method for obtaining image data, the method comprising:
acquiring image data by exposing an imaging array to optical radiation and operating the imaging array, wherein acquiring the image data comprises allowing the optical radiation to pass through an optical filter before interacting with pixels of the imaging array and spatially modulating a response of the imaging array to each of a plurality of components of the optical radiation according to a corresponding basis function for an invertible transformation;
applying the transformation to the image data to yield transformed image data, the transformed image data comprising spatially-separated image copies corresponding respectively to the plurality of components;
extracting the spatially-separated image copies from the transformed image data; and
applying an inverse of the transformation to each of the extracted image copies;
wherein the optical filter has a spatial variation having at least first and second spatial frequencies
wherein the optical filter comprises tiles that repeat in a multiple of a pitch of pixels of the imaging array.

10. A method for obtaining image data, the method comprising:
acquiring image data by exposing an imaging array to optical radiation and operating the imaging array, wherein acquiring the image data comprises spatially modulating a response of the imaging array to each of a plurality of components of the optical radiation according to a corresponding basis function for an invertible transformation;

applying the transformation to the image data to yield transformed image data, the transformed image data comprising spatially-separated image copies corresponding respectively to the plurality of components;

extracting the spatially-separated image copies from the transformed image data; and, applying an inverse of the transformation to each of the extracted image copies;

wherein the basis functions corresponding to the plurality of components are mutually orthogonal.

11. A method according to claim 10 wherein the components comprise primary colors.

12. A method according to claim 10 wherein the components comprise a red component a blue component and a green component and acquiring the image data comprises modulating each of the red, blue and green components at a distinct spatial frequency.

13. A method for obtaining image data, the method comprising:

acquiring image data by exposing an imaging array to optical radiation and operating the imaging array, wherein acquiring the image data comprises spatially modulating a response of the imaging array to each of a plurality of components of the optical radiation according to a corresponding basis function for an invertible transformation;

applying the transformation to the image data to yield transformed image data, the transformed image data comprising spatially-separated image copies corresponding respectively to the plurality of components;

extracting the spatially-separated image copies from the transformed image data; and applying an inverse of the transformation to each of the extracted image copies;

wherein a direction of the spatial modulation is not aligned with rows or columns of the imaging array.

14. A method for obtaining image data, the method comprising:

acquiring image data by exposing an imaging array to optical radiation and operating the imaging array, wherein acquiring the image data comprises spatially modulating a response of the imaging array to each of a plurality of components of the optical radiation according to a corresponding basis function for an invertible transformation;

applying the transformation to the image data to yield transformed image data, the transformed image data comprising spatially-separated image copies corresponding respectively to the plurality of components;

extracting the spatially-separated image copies from the transformed image data; and applying an inverse of the transformation to each of the extracted image copies;

wherein the components comprise polarization states.

15. An imaging array comprising a filter array having a plurality of first filter cells for a first spectral band and a plurality of second filter cells for a second spectral band, wherein filter transmissivities of the plurality of first filter cells for the first spectral band vary spatially with a first spatial frequency, and filter transmissivities of the plurality of second filter cells for the second spectral band vary spatially with a second spatial frequency, the first spatial frequency and the second spatial frequency being different.

16. An imaging array according to claim 15 wherein the transmissivity for each of the spectral bands varies sinusoidally.

17. An imaging array according to claim 15 wherein each of the first and second spectral bands comprises a band passing red light, a band passing blue light or a band passing green light.

* * * * *

UNITED STATES PATENT AND TRADEMARK OFFICE
CERTIFICATE OF CORRECTION

PATENT NO. : 8,860,856 B2  Page 1 of 1
APPLICATION NO. : 13/142851
DATED : October 14, 2014
INVENTOR(S) : Gordon Wetzstein et al.

It is certified that error appears in the above-identified patent and that said Letters Patent is hereby corrected as shown below:

In the Specification

At col. 10, ln. 55, "size pqxmn" is corrected to -- size pqxmn. --

At col. 11, ln. 13, "sensor noise 11" is corrected to -- sensor noise $\eta_i$ --

Signed and Sealed this
Tenth Day of February, 2015

Michelle K. Lee
*Deputy Director of the United States Patent and Trademark Office*